United States Patent [19]

Sawicki

[11] Patent Number: 4,457,599

[45] Date of Patent: Jul. 3, 1984

[54] COMPOSITE PHOTOGRAPHY APPARATUS AND METHOD

[76] Inventor: Walter M. Sawicki, 724 Cambridge Dr., Burbank, Calif. 91504

[21] Appl. No.: 407,060

[22] Filed: Aug. 11, 1982

[51] Int. Cl.³ ............................................. G03C 1/00
[52] U.S. Cl. ...................................... 352/89; 352/45; 352/46
[58] Field of Search ....................... 352/89, 45, 46, 47, 352/88, 81

[56] References Cited

U.S. PATENT DOCUMENTS

| 1,860,737 | 5/1932 | Handschiegl | 352/45 |
| 2,054,401 | 9/1936 | Whitman | 352/88 |
| 2,337,327 | 12/1943 | Haskin | 352/89 |

FOREIGN PATENT DOCUMENTS 637448 5/1950 United Kingdom ................... 352/45

Primary Examiner—Monroe H. Hayes
Attorney, Agent, or Firm—Roger A. Marrs

[57] ABSTRACT

Apparatus and method is disclosed herein for producing a pair of identical images on the same piece of film except for the appearance of the background which becomes black behind one of the images and clear behind the other. The apparatus includes a background screen reflecting polarized light and a motion picture camera having an image duplicating device carried before the lens thereof comprising a beam split element for optically conducting a pair of images simultaneously through filters via front surface mirrors and prisms to a recording film strip. One filter is of neutral density so that a half frame on the film strip records a black image on a clear background while the other filter is a polarizing filter producing a clear image on a black background on the other half of the film strip frame.

7 Claims, 7 Drawing Figures

U.S. Patent     Jul. 3, 1984     4,457,599
FIG. 1
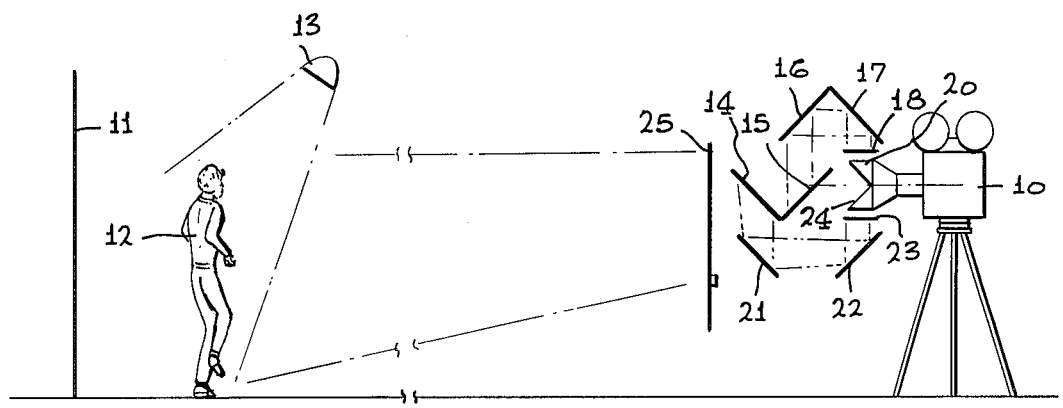
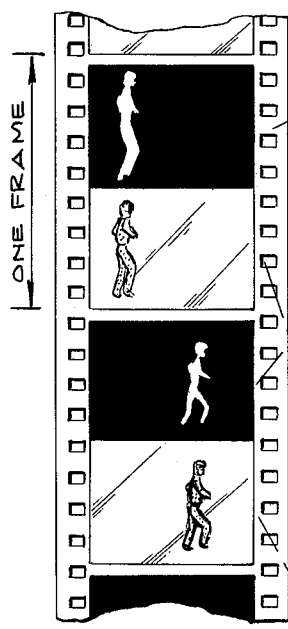
FIG. 2
NEGATIVE
ONE FRAME
FIG. 4
POSITIVE
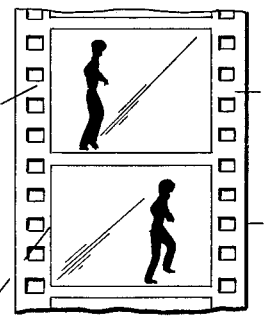
FIG. 5
POSITIVE
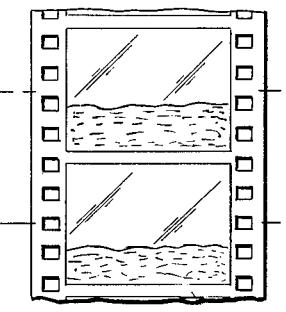
FIG. 6
NEGATIVE
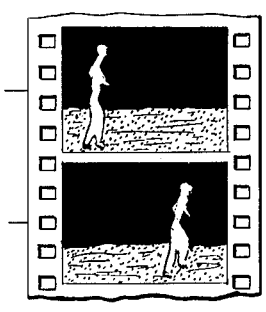
NEGATIVE
FIG. 3
POSITIVE
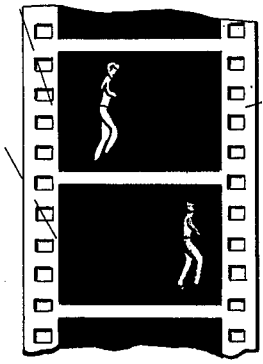
FIG. 7
POSITIVE

COMPOSITE PHOTOGRAPHY APPARATUS AND METHOD

BACKGROUND OF THE INVENTION

1. Field of the Invention

This invention relates to the field of composite photography and more particularly to a novel apparatus and method for producing a single, composite film strip having multiple image elements derived photographically at different times and places.

2. Brief Description of the Prior Art

Composite photography is described as the process of making pictures in which background and foreground images are obtained photographically from separate sources and subsequently combined to produce a completed picture on a single film medium. To obtain a satisfactory combination of the respective separately obtained photographic images, means must be provided to prevent overlapping of the respective image elements otherwise distortion and indefiniteness would result.

The art of traveling matte photography has been in use for several years for overcoming problems dealing with overlapping through the use of two basic systems. The primary objective of these systems is to produce a silhoutte of the foreground image or object in black against a clear field which is known as a traveling matte. This image or matte is placed in front of a background image and the two are photographed. The traveling matte prevents the background in the area of the foreground object from being recorded, thus leaving a hole for the foreground to be photographed on a subsequent exposure.

The most common system in use is commonly known as the blue screen technique. An actor or object is positioned in front of a translucent blue screen which is illuminated from the rear. The actor is lit normally and both are photographed onto standard motion picture film. Then, film undergoes a great many laboratory duplications and filtration to eliminate the blue tint of the screen and replace it with the background image. Inherent problems of this system have been the danger of blue light spilling on the actor or blue clothing, either one of which will render the actor transparent to the background in those areas so contaminated. The system is oftentimes costly and characterized by a cut-out look of the foreground object since soft edges and blur are difficult to maintain in the process.

The other system makes use of a beam splitting camera which is a camera that can photograph the same image on two strips of film simultaneously. Through the use of such a camera, one can produce the foreground against black on one film and its traveling matte on the other film. This is accomplished by the use of specially illuminated actors and screens coupled with film stocks which are in turn sensitive and insensitive to the particular wavelengths of light used for photography. Sodium vapor, infra-red, ultra-violet or similar light is used to illuminate the screen which is rendered black on one film and clear on the other depending on the respective films sensitivity to produce the aforementioned photographic elements. Although this system greatly simplifies the optical laboratory processes and produces excellent composites, its primary disadvantage resides in the requirement for a very specialized camera and exotic light sources. Also, the system is subject to changing improvements in film stocks which may suddenly become sensitive to the lights specifically designed to be invisible to the film.

Therefore, a long standing need has existed to provide an economical and relatively simple apparatus and method for taking single images and combining these separate images onto a single film medium without distortion or degradation of image quality.

SUMMARY OF THE INVENTION

Accordingly, the above problems and difficulties are obviated by the present invention which provides for a novel apparatus and method capable of producing a pair of identical images within a single frame on a strip of film so that the appearance of the background is black behind one of the images and clear behind the other. The apparatus includes a background screen means reflecting polarized light and a motion picture camera separated by the object of which the picture is being taken. An image duplicating device is carried on the camera immediately ahead of the lense which includes a beam splitting means for redirecting the image along opposite axes and through front surface mirror means associated with each of the axes for redirecting the images through separate filter networks. One of the filter networks associated with one of the split images comprises a prism for receiving the image after passing through a polarized filter before introduction to the film strip frame while the other image passes through a similar prism after passing through a neutral density filter and then to the frame of the film strip. By this means, two identical images are produced on the same piece of film except for the appearance of the background screen which becomes black behind one of the split images and clear behind the other.

Therefore, it is among the primary objects of the present invention to provide a novel composite photography apparatus and method wherein the matte is produced simultaneously with the foreground image and wherein exotic lighting systems are not required.

Another object of the present invention is to provide a novel composite photography system wherein the background images and the foreground images are obtained from separate sources and are subsequently combined to produce a completed picture on the same film strip and frame without the need for expensive and complex filming and lighting apparatus.

Still another object of the present invention is to provide a novel polarized single film traveling matte process and apparatus therefor which employs the use of any registered motion picture camera coupled with a novel beam splitting means and filtering network to record on one strip of film, a self-matting foreground element and its traveling matte on alternate frames.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a diagrammatic view of the composite photography apparatus and method incorporating the inventive concept;

FIG. 2 is a diagrammatic view of a negative obtained from the apparatus used in FIG. 1;

FIGS. 3 and 4 are positive prints taken from the negative shown in FIG. 2 having the respective foregrounds and mattes combined in an action sequence;

FIG. 5 is a diagrammatic view of a suitable background print;

FIG. 6 is a negative including the background shown in FIG. 5; and

FIG. 7 is a print of film strip showing the final composite after the film negative in FIG. 6 has been processed and printed.

DESCRIPTION OF THE PREFERRED EMBODIMENT

Referring to FIG. 1, a composite photographic system is illustrated incorporating the inventive concept which includes a conventional motion picture camera 10 that is arranged in spaced apart relationship with respect to a background screen 11. A subject of interest, such as an actor or object 12, is positioned between the camera and the screen. Mounted on the camera so as to lie along its central optical axis, there is provided a beam splitting and filtering apparatus which is preferrably detachably connected and carried on the camera. The actor 12 is positioned in front of the screen 11 so that either one reflects or transmits polarized light. The actor is lit by conventional means such as lamp 13 and no stray light is permitted to contaminate the screen. Only polarized light must emanate from the screen. The image of the actor and the screen travels to a beam splitting means 14, which includes a beam splitting element that can be a partially silvered mirror whose function it is to partly transmit and reflect light that falls upon its surface. The beam splitting element 14 lies on the optical axis of the camera lens. As can be seen in the diagram, the light transmitted by the beam splitting element 14 is reflected by a series of front surface mirrors 15, 16 and 17 consecutively. Thereafter, the light is introduced through a polarized filter 18 which is positioned in such a way as to cancel out the polarized light from the screen. The image passes through the filter 18 and reflects from a mirror or prism 20 and is recorded through the lense of the camera on one half of the motion picture frame. This image consists of a normally reproduced actor in front of a black screen as background. Conversely, the identical image of the actor and screen is reflected by the beam splitter element 14 and transmitted by another or second set or series of front surface mirrors 21 and 22 to a neutral density filter 23. Filter 23 is of neutral density so that it grays down the image of the actor and the screen. If the polarized screen is illuminated with a greater percentage of light than that lighting the actor, a neutral density filter can be used to darken the actor to the point where the film records the actor as a black silhouette while at the same time not having enough density to effect the screen which records as white on the film. The image passing through this latter filter reflects on a mirror or prism 24 and records the matter on the strip of film as the other half of the frame. It should be noted that the distances of mirrors 21 and 22 are adjusted in relation to the rest of the apparatus to obtain an identical length of light path of the matte image and that of the polarized foreground image. Thereby, identical images are produced on the film plane of the camera. In order to insure identical images, the shutter of the camera is removed so that it has no effect on the exposure of the film. In its place, synchronized by any suitable means with the camera, there is an auxilliary shutter 25 which is placed in front of the beam splitting device or optics so that even the shutter action is split identically. Conversely, the angle of the built-in camera shutter can be adjusted to have a wider angle than the auxilliary shutter. In this way, when the two shutters are put into synchronization, the interior camera shutter will have no effect on exposure thereby eliminating the necessity for removing it.

If desired, the process may be modified by other means so that the beam splitting and filtering occurs behind the lense.

The following is a description of one film format and laboratory procedure; however, any film size and method of obtaining the matte are viable. In this description, a Vistavision motion picture format is used. Most theatrical motion picture work makes use of a four perforation high image on 35 mm film. Vistavision is an eight perforation long image area that was utilized in the wide screen processes of years ago. Since this format is essentially two full size four perforation high images placed one on top of the other, one can readily see that no loss of image quality is suffered by splitting the frame in two.

FIG. 2 illustrates the negative obtained from the inventive process. Each individual frame or separate position (if it exists) of the foreground object is recorded on two four perforation high, frame size images or one Vistavision frame. One image exists as a negative actor in front of a clear screen and the identical adjacent image is that of a clear actor in front of a black screen. These images are separated by means such as an optical printer by alternately printing every other image. One such skip framed print would contain only the images composed of the silhouette actor thereby obtaining the traveling matte shown in FIG. 4. The other images are alternately printed in the same manner obtaining a positive actor in front of a black background as shown in FIG. 3.

A suitable background print, such as FIG. 5 is made at any convenient time, or may be obtained from the film library, according to the requirements. This background image is held in register with the traveling matte of FIG. 4 and rephotographed onto a suitable film. This printing step yields a film having an exposure, or latent image thereon, corresponding to the background scene, but with an unexposed portion corresponding to the opaque silhouette of the matte of FIG. 4. Thereafter, the same film of FIG. 6 is printed a second time with the foreground positive of FIG. 3. The black screen surrounding the performer on this film prevents reexposure of the background while the image of the actor fills in the unexposed area left by the traveling matte. This operation produces the final composite which is shown in FIG. 7 after the film in FIG. 6 has been processed and printed.

As can be seen, a number of advantages are incurred with this system. Any of the 35 mm motion picture formats can be used with this process. In the case of conventional four perforation format, some means is utilized in the printing stages of FIG. 3 and FIG. 4 to mask off those portions of the rephotographed area that are not within a two perforation high image. If an area the size of a four perforation frame were copied for example, some means must be provided to prevent the adjacent images of the matte or foreground from photographing. Most motion picture work is done in a 1.85:1 image area of a four perforation format, one can readily see that the area of a matted actor can easily fall within the aspect ratio above even if only two perforations of the four are used. Furthermore, the background remains in a convenient size for duplication being four perforations high. Any degradation that may occur would only do so in the foreground area being matted in due to possible enlargement of the image. Since the matte and the foreground are produced on the same piece of film, the registration and shrinkage characteristics of the matte are ideal. Since the matte and foreground are shot on conventional motion picture negative instead of high contrast film, natural blurring of the image is preserved thereby producing a better composite without the cut out look. Laboratory operations are greatly reduced. Polarized light is not subject to color sensitivity so any color can be used in the foreground object including blue. Exotic light sources such as sodium vapor or infra-red need not be utilized.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. Apparatus for use in composite photography comprising the combination of:
   a motion picture camera having a lens and a length of film for recording images thereon via said lens;
   a beam splitting means carried on said camera and having optical elements substantially lying along the optical axis of said lens;
   a background means in spaced relationship to said camera and disposed behind a subject intended to be recorded on said film; and
   said optical elements including a beam splitting element for optically dividing an image of said subject into a pair of identical images and further including filter elements for modifying said pair of images so that each image and background therefor is reversed when recorded on said length of film.

2. The invention as defined in claim 1 wherein:
   said pair of respectively reversed images are contained within a single frame of said length of film.

3. The invention as defined in claim 2 including:
   a multiplicity of front surface mirrors optically arranged between said beam splitting element and said filters.

4. The invention as defined in claim 3 wherein:
   a selected one of said filters is of neutral density so that a half frame on said film records a black image on a clear background and said other filter is a polarizing filter producing a clear image on a black background on the other half of the film frame.

5. The invention as defined in claim 4 wherein:
   said background means is a screen characterized as reflecting polarized light.

6. The invention as defined in claim 5 including:
   a shutter operably carried on said beam splitting means lying across the optical axis of said camera lens.

7. The invention as defined in claim 6 including:
   a first prism associated with said front surface mirrors for receiving said image of said subject; and
   a second prism disposed between each of said filters and lens for conducting the image thereto.

* * * * *